United States Patent [19]

Wildemann et al.

[11] Patent Number: 4,867,317
[45] Date of Patent: Sep. 19, 1989

[54] POSITIONING DEVICE

[75] Inventors: Willi Wildemann, Koblenz; Helmut Morgen, Mannebach; Castor Fuhrmann, Brachtendorf; Martin Siemann, St. Sebastian; Jurgen Kessler, Montabaur; Herbert Freitag, Koblenz, all of Fed. Rep. of Germany

[73] Assignee: Stabilus GmbH, Fed. Rep. of Germany

[21] Appl. No.: 164,430

[22] Filed: Mar. 3, 1988

[30] Foreign Application Priority Data

Mar. 6, 1987 [DE] Fed. Rep. of Germany ....... 3707158

[51] Int. Cl.$^4$ .................. B60J 5/00; F05C 17/28
[52] U.S. Cl. ..................... 267/64.12; 92/15; 267/64.11; 267/120
[58] Field of Search ............... 267/64.11, 64.12, 64.13, 267/64.15, 120; 92/15, 30

[56] References Cited

U.S. PATENT DOCUMENTS

| 4,066,279 | 1/1978 | Kaptanis | 280/711 |
| 4,078,778 | 3/1978 | Hubweber | 267/64.12 |
| 4,307,874 | 12/1981 | Schnitzius et al. | 267/120 |
| 4,323,224 | 4/1982 | Freitag et al. | 267/120 |
| 4,527,780 | 7/1985 | Bich | 267/64.12 |
| 4,548,389 | 10/1985 | Smith et al. | 267/64.11 |

FOREIGN PATENT DOCUMENTS

| 1442735 | 7/1976 | United Kingdom . |
| 1476496 | 6/1977 | United Kingdom . |
| 1529171 | 10/1978 | United Kingdom . |
| 1455803 | 11/1978 | United Kingdom . |
| 2017808 | 10/1979 | United Kingdom . |

Primary Examiner—Andres Kashnikow
Assistant Examiner—Matthew C. Graham
Attorney, Agent, or Firm—Brumbaugh, Graves, Donohue & Raymond

[57] ABSTRACT

A positioning device is e.g. used for positioning the door of a motor vehicle in an opened position. The positioning device comprises e.g. a cylinder and a piston rod which extends inward and outwards of the cylinder through one end thereof. A flank face is provided at the inner wall surface of the cylinder. The piston rod carries a piston. The piston is provided with a counter-arresting ring which engages the flank face in a predetermined position. When the piston passes across the arresting flank of the cylinder, the counter-arresting ring is moved radially inwards with respect to the axis of the piston rod against elastic resistence. So, an increased resistance occurs against the axial movement of the piston rod with respect to the cylinder. This increased resistance against axial movement positions the door with respect to the body frame of a motor vehicle in a predetermined opened position and avoids that the door is closed unintentionally. Af the flank face and the arresting ring are enclosed within the cavity of the cylinder, they are not subject to environmental conditions, which might deteriorate their positioning function after a period of use. Lubricating agent may be provided within the cavity for lubricating the flank face and the arresting ring. As such lubricating agent is enclosed within the cavity of the cylinder, there is no risk for the vehicle driver to be polluted by the lubricating agent.

52 Claims, 7 Drawing Sheets

POSITIONING DEVICE

BACKGROUND OF THE INVENTION

A positioning device as considered in the present invention is e.g. used for fixing a door in a predetermined position. Positioning devices are known in the construction of motor vehicles and are mounted in the area of the pivot axes of the motor vehicle doors, such as to prevent an unintentional closing of an opened door.

EXPLANATION OF THE PRIOR ART

In the prior art positioning devices are used which allow access to the cooperating arresting means and counter-arresting means engageable with each other in a predetermined position of the vehicle door. The arresting means and counter-arresting means are therefore subject to environmental influences, for example dust and humidity. By pollution and corrosion the function of the positioning element is therefore deteriorated after a period of use. Increased resistance against opening and closing the respective door occurs. Such increased resistance frequently results in a clamping of the door and noise. In order to overcome these functional disadvantages, the arresting means and counter-arresting means must be continuously lubricated. As a result of lubrication the user may contact his clothes with lubricating agent and make his clothes dirty.

OBJECTS OF THE INVENTION

It is an object of the present invention to create a positioning device, the function of which does not change even after a long period of use without continuous service. Moreover, a compact construction of the positioning device is to be created which is composed of easily available components and has a simple functional and highly aesthetic appearance.

The risk of polluting the user is to be avoided.

SUMMARY OF THE INVENTION

In view of the above objects the positioning device of the present invention comprises a first positioning member, namely a casing having a longitudinal cavity with an axis, longitudinal wall means and two ends. The longitudinal wall means define an inner wall surface. A second positioning member extends inwards and outwards of the cavity through at least one of the two ends and is movable with respect to the cavity along the axis thereof. The first positioning member is provided with arresting means within the cavity and the second positioning member is provided with counter-arresting means. The arresting means and the counter-arresting means are mechanically engageable with each other in at least one predetermined relative position of the first and the second positioning members. The engagement of the arresting means and the counter-arresting means provides increased resistance against relative movement of the first and the second positioning members in at least one direction of relative movement of the positioning members. The arresting means and the counter-arresting means are sealingly enclosed within the cavity. The first and second positioning members are provided with respective fastening means outside the cavity for fastening the positioning members to respective construction elements.

By sealingly enclosing the arresting means and the counter-arresting means the positioning device is free of need for service. It is insensitive to environmental influences like pollution and corrosion. As a result thereof, the desired function is maintained during a long period of use. There is no risk of pollution for the user. The positioning device is composable of simple and easily available components and has a highly aesthetic appearance.

According to a most compact and simple embodiment the first positioning member is a cylindrical casing, and the second positioning member is a piston rod member, which is provided with a piston unit within the cavity. The counter-arresting means are part of the piston unit and engage the arresting means on the cylindrical casing.

In view of a simple construction and simplified attachment to the construction elements, it is desirable that the piston rod member extends through only one end of the cavity, and that the other end of said cavity is closed by an end wall.

A most reliable construction is obtained, when the arresting means comprise at least one flank face adjacent to said inner wall surface, said flank face being inclined with respect to the axis when regarded in a sectional plane containing this axis. In this case the counter-arresting means comprise a counter-arresting member radially inwardly displaceable with respect to the second positioning member against elastic resistance. Radial inward movement of this counter-arresting member occurs in response to axial movement of the second positioning member with respect to the first positioning member when the counter-arresting member passes across the flank face.

The flank face can easily be obtained as a result of an annular deformation of the longitudinal wall means. By such annular deformation of the longitudinal wall means one can provide either a radially inwardly projecting rib at the inner wall surface or a radially outwardly extending groove in the inner wall surface. In both cases the rib or groove, respectively, provides two opposite flank faces.

According to a first embodiment of the counter-arresting member an annular body of elastic material is used, which has at least one flank engagement face. This annular body is radially compressed and expanded, respectively, when passing a flank face.

In order to improve the guidance of the second positioning member, the body of elastic material may be provided with an external circumferential face engaging the inner wall surface. A braking effect may be obtained by such engagement, if desired. The external circumferential face of the annular body may be provided with recesses.

In order to allow exchange of gas between the spaces on both sides of the piston, the recesses may be axially extending grooves.

In order to provide and maintain lubricant at the location of engagement between the annular body and the inner wall surface of the casing, the annular body of elastic material may also be provided with circumferentially extending grooves. The elastic material may for example be a polyurethane resin. The braking effect may be varied by providing in the annular body of elastic material a radially elastic reinforcement ring member which may be vulcanized within the annular body.

The flank engagement face may be inclined with respect to the axis by an acute angle of selected value.

By selection of the angle value the resistance peaks may be adapted to the respective application.

The external circumferential face may have an axial length substantially smaller than the axial length of the annular body of elastic material. By selecting this axial length of the circumferential face the friction force may be varied.

According to a further embodiment the counter-arresting member comprises an axially slit annular member with a radially inner peripheral face and a radially outer peripheral face, said axially slit annular member being biased for radial expansion. The radially outer peripheral face is provided with a radially outwardly opening peripheral groove. This peripheral groove receives a radially inwardly projecting rib when said second positioning member moves with respect to the first positioning member and said counter-arresting means pass across said arresting means.

The axially slit annular member may be located axially between two abutment discs mounted on the second positioning member, such as to support the slit annular member in axial direction with respect to the second positioning member. The axially slit annular member may consist of a plurality of segments. The axially slit annular member may be biased for radial expansion by at least one elastic biasing member engaging the radially inner peripheral face of the axially slit annular member. This elastic biasing member may be in the form of an annular biasing member of rubber elastic material. This annular biasing member of rubber elastic material may be supported by a radially outer supporting face of the second positioning member.

The just described embodiment with the radially outwardly opening peripheral groove is particularly desirable when it is intended to provide in a predetermined relative position an increased axial resistance in both directions of relative axial movement of the first and the second positioning member.

In case the cylinder is provided with a radially outwardly extending groove, the counter-arresting member may be an annular groove engagement member biased for radial expansion. This embodiment also provides increased axial resistance for both directions of axial movement between the first and the second positioning member.

A further embodiment of the counter-arresting member provides at least one ball member radially movable with respect to the second positioning member and biased in radially outward direction by a ball biasing member supported by the second positioning member.

The ball biasing member may be annular and made of elastic material. For protection of the elastic material a radially expandable intermediate ring may be provided radially between the ball member and the annular ball biasing member.

In order to increase the elastic resistance and to avoid premature deterioration, a plurality of ball members may be provided. This plurality of ball members may be received by an annular cage member, in order to facilitate assembling the positioning device.

In all embodiments of the present invention the arresting means and the counter-arresting means may provide different resistances against relative movement in response to the direction of relative movement of the first positioning member and the second positioning member.

This is desirable for example in positioning motor vehicle doors which should be easily movable in opening direction and provide an increased resistance in a predetermined position only against closing.

The idea of varying the resistance may be performed for example by a plurality of flank faces of different inclinations with respect to said axis. Another possibility is to provide the counter-arresting member with a plurality of flank engagement faces of different inclinations with respect to the axis. A further possibility of varying axial resistance of relative movement of the first and second positioning members is that the elastic resistance resisting radial inward movement of the counter-arresting member is variable in response to the direction of axial relative movement of the first positioning member and the second positioning member.

This possibility can be constructionally realized such that the counter-arresting member frictionally engages the inner wall surface and is radially supported with axial play on a conical support face of the second positioning member.

While the counter-arresting means may simultaneously fulfill a braking function through extended ranges of relative movement, additional brake means may be provided between the first and the second positioning members for braking axially relative movement of these members in at least one range of movement outside said predetermined relative position. Such additional brake means may comprise an annular frictional member of elastic material radially supported by the second positioning member and frictionally engaging the inner wall surface. Also, such additional brake means may have different braking effects in response to the direction of relative axial movement of said first and said second positioning members.

Such direction-responsive braking effect is particularly desirable in motor vehicle construction, where it is frequently desired to brake the opening movement of a door such that a gust of wind cannot suddenly fully open the door, whereas the closing of the door should be essentially non-braked—after said predetermined position has once been crossed, such that the door can easily fall into the lock. The direction-responsive braking effect can be obtained in that the annular frictional member is radially supported with axial play by a conical support face of the second positioning member.

In consideration of the use on motor vehicles and similar applications fastening means should be suited for pivotally fastening the first and the second positioning members to respective construction elements.

In order to easily locate the positioning device even under limited space conditions, it is desirable that the fastening means of the first positioning member are provided adjacent to that end of the first positioning member through which the second positioning member extends.

A possible type of fastening means provides adjacent to said one end of said cavity at least one of a pivot bore or pivot pin substantially radial with respect to said axis. Preferably diametrically opposed pivot bores or pivot pins are provided.

Another embodiment permitting pivoting movement of the first positioning member with respect to the respective construction element consists in that said casing is provided adjacent to said at least one end with a partially spherical ball head received by a ball socket of the respective fastening means. This spherical ball head may be shaped from material of the casing, or may be provided on a ball head carrier member fastened to said casing adjacent to said at least one end of said cavity.

A third embodiment of pivotable fastening means for said first positioning member is obtained by providing an annular elastic fastening member engaging at least one of said casing and a guiding member guiding said second positioning member adjacent to said one end of said cavity. This annular elastic fastening member may be engaged in groove means adjacent to said one end of said cavity through which said second positioning member extends. On the other hand the annular elastic fastening member may be engageable with a rigid fastening member fixed with respect to the respective construction part. In this case, pivoting movement is obtained by elastic deformation of the annular elastic fastening member. This is a very inexpensive solution in cases where only small pivotal movement is required.

As mentioned before, one of the construction elements may be a body frame of a motor vehicle and the other one of the construction elements may be a door of the motor vehicle. In this case, one positioning member is fastened to the body frame, and the other one may be fastened to the door. In case of a door being pivotally mounted on the body frame about a door pivot axis, the first and second positioning members may be pivotally fastened to respective ones of the body frame and the door about fastening pivot axes substantially parallel to the door pivot axis.

As the doors of motor vehicles are frequently box constructions defining a hollow space, the casing may be accommodated within such hollow space.

The various features of the invention are discussed especially in the accompanying claims which form a part of the disclosure. For the better understanding of the invention, its working advantages and specific effects reference is now made to the accompanying drawings and the description, in which preferred forms of embodiment of the invention are discussed.

BRIEF DESCRIPTION OF THE DRAWINGS

The invention will be explained in greater detail below by reference to the forms of embodiment as represented in the drawing, wherein.

DESCRIPTION OF THE PREFERRED EMBODIMENTS

Figure 1:
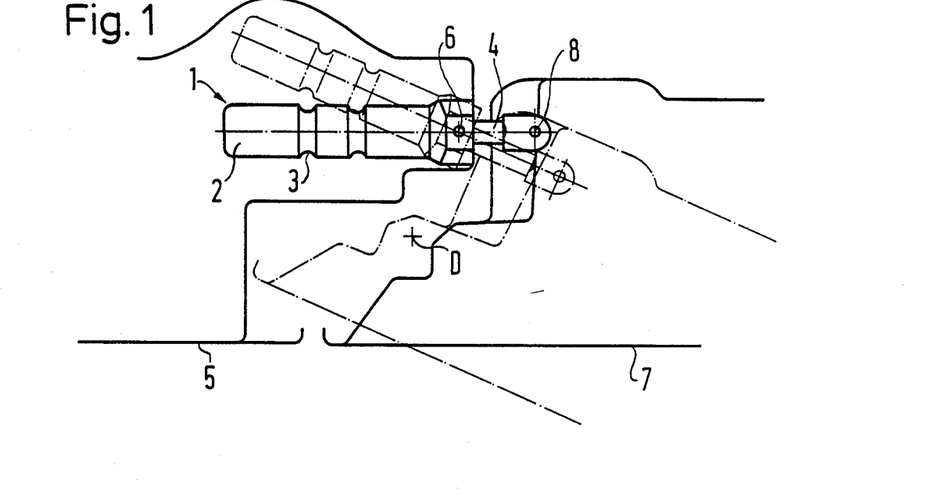
FIG. 1 shows a positioning device in which the casing of the positioning device is pivotally mounted on the body frame.
Figure 2:
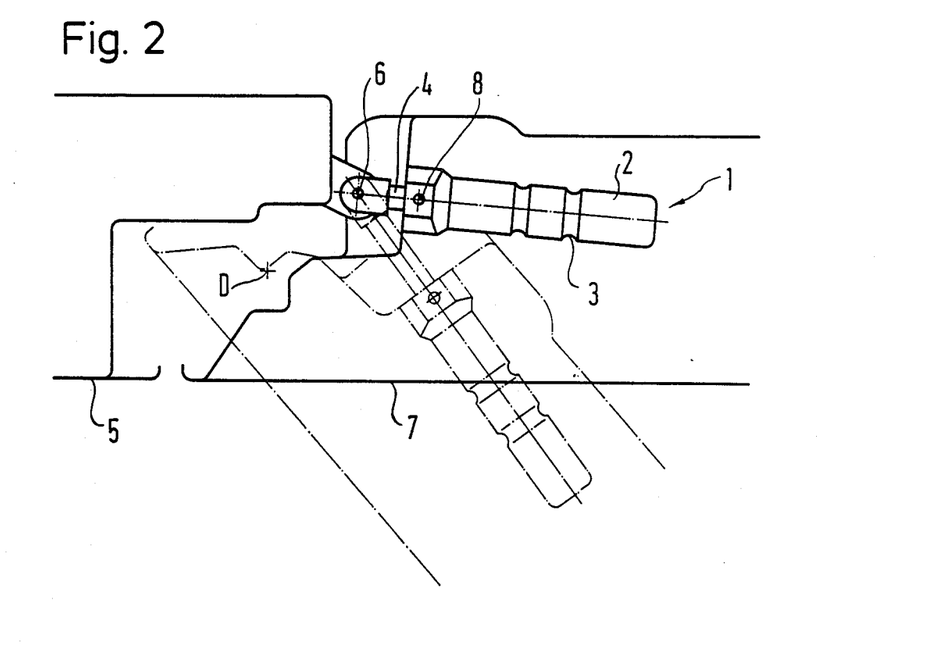
FIG. 2 shows the positioning device when the piston rod is pivotally mounted to the body frame.

FIGS. 1 and 2 show the positioning device between a motor vehicle door and the body frame of the motor vehicle. The door 7 is pivotally mounted by joint means (not shown) on the body frame 5 about a door pivot axis D. In FIG. 1 the positioning device 1 comprises a casing or cylinder 2 pivotally mounted to the body frame 5 about an axis 6 and a piston rod 4 pivotally mounted to a door 7 about the axis 8.

According to FIG. 2 the casing 2 of the positioning device 1 is pivotally mounted to the door 7 about an axis 8, and the piston rod 4 is pivotally mounted to the body frame 5 about an axis 6. In both embodiments of FIGS. 1 and 2 the piston rod 4 is axially movable with respect to the casing 2 when the door 7 is pivoted about the axis D. When the door is partially or fully opened, it is desirable to provide an increased resistance against closing the door. This increased resistance is provided by the positioning device 1.

Figure 3:
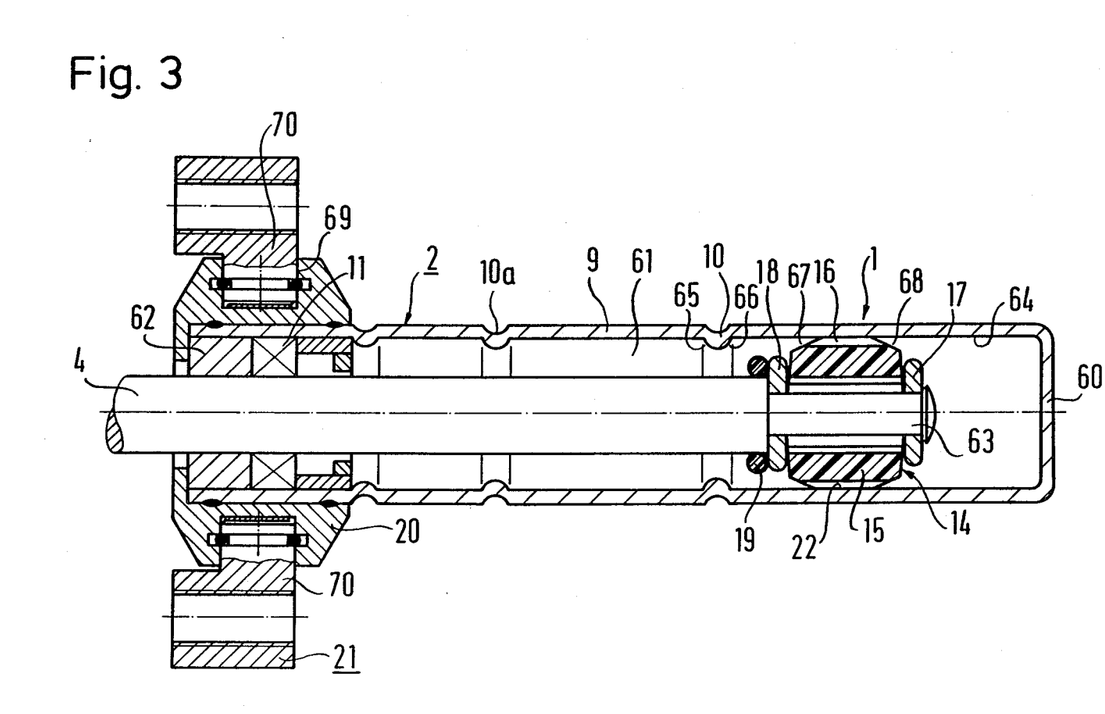
FIG. 3 shows a longitudinal section through a first embodiment of the positioning device.

According to FIG. 3, the casing or cylinder 2 comprises a cylindrical wall 9. This wall 9 is provided with circumferential deformations 10, which establish radially inwardly projecting ribs. The cylinder 2 is provided at one end thereof with an end wall 60 and encloses a cavity 61. The other end of the cylinder 2 is provided with a sealing ring 11 and a guiding ring 62. The piston rod 4 is guided by the guiding ring 62. The cavity 61 is sealed by the sealing ring 11. On an extension 63 of the piston rod 4 there is provided a piston unit 14. This piston unit 14 comprises an annular body 15 of rubber elastic material. The annular body 15 is located between two abutment discs 17 and 18 and is prestressed therebetween. A circumferential face 22 of the annular body 15 is provided with axial grooves 16. This circumferential face 22 frictionally engages an inner wall surface 64 of the cylinder 9. The annular body 15 is biased into frictional engagement with the inner wall surface 64. The annular deformation 10 appearing as a rib on the inner wall surface 64 provides flank faces 65 and 66. The annular body 15 is provided with flank engagement faces 67 and 68.

When opening the door, the piston rod 4 moves outward of the cylinder 9. Then the annular body 15 passes against increased resistance the rib 10 and is compressed radially inwards. On further opening the door also the second rib 10a is passed, such that this positioning device has two predetermined positions of arresting action, a first one in the fully opened condition and a second one in a partially opened condition. In closing the door the ribs 10a and 10 must also be passed by the annular body 15. The resistance necessary to overcome the ribs 10a and 10 is considerably larger than the resistance afforded by friction between the annular body 15 and the inner wall surface 64. In order to avoid hard abutment in the most extended terminal position, an elastic bumper ring 19 is provided on the piston rod 4. The annular body 15 consists of a plastic material having good sliding property. For further reducing wear and noise a lubricant is provided within the cylinder 9. For pivotally mounting the cylinder 9 at a door a pivot unit 20 is fastened to the cylinder 9 adjacent to the guiding ring 62. The pivot unit 20 is provided with diametrically opposed pivot bores 69 engaged by L-shaped pivot pins 70 which may be fixed to the door or to the body frame by bolts.

Figure 4:
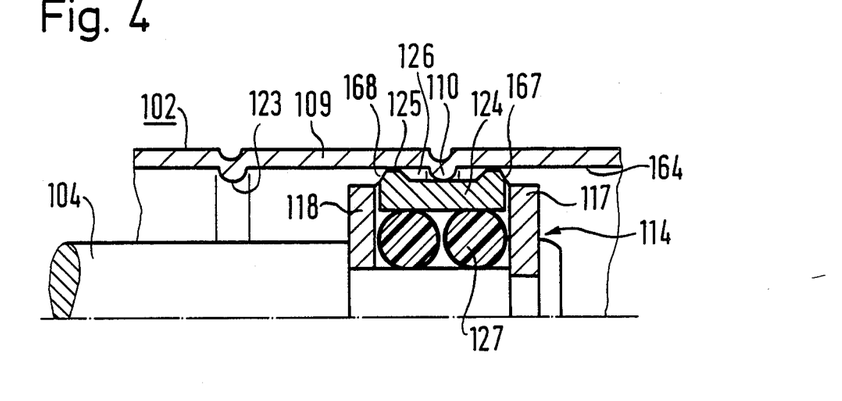
FIG. 4 shows a partial view of a second embodiment of a positioning device.

In the embodiment of FIG. 4 the piston rod 104 carries an axially slit annular member 124. This annular member 124 has an outer peripheral face 125 with a peripheral groove 126 therein. The radial depth of this peripheral groove 126 corresponds substantially to the radial measure of the rib defined by the deformation 110. For radially biasing the slit annular member 124 against the inner wall surface 164 of the cylinder 102 rubber elastic annular biasing members 127 are provided which are radially compressed on radial compression of the slit annular member 124. The slit annular member 124 is made of spring steel or glass fiber reinforced plastic material. When the slit annular member 124 passes the rib 123, this rib 123 enters into the groove 126 so that a further arrested position is possible. The slit annular member 124 has chamfered flank engagement faces 167 and 168. The annular members 124 and 127 are axially located between abutment discs 117 and 118, which are parts of the piston unit 114. The slit annular member 124 may be replaced by a plurality of segments.

Figure 5:
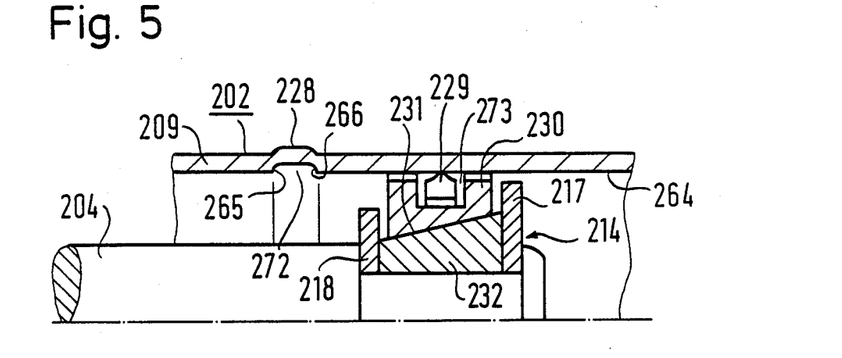
FIG. 5 shows a partial view of a third embodiment of the positioning device.

In the embodiment of FIG. 5 the cylinder 202 is provided with a radially outwardly directed deformation 228 which forms an inner groove 227 limited by flank faces 265 and 266. An annular groove engagement member 229 is biased radially outwardly and is accommodated within a groove 273 of a carrier ring 230. The carrier ring 230 is located with axial play between abutment discs 218 and 217 of the piston unit 214. The carrier ring 230 is radially supported by a radially outer supporting face 231 of a support ring 232 fixed to the piston rod 204. The groove engagement member 229 is frictionally sliding along the inner wall surface 264. Due to friction of the groove engagement member 229 along the inner wall surface 264 the slit carrier ring 230 is more or less spread in response to the direction of movement of the piston rod 204. On movement of the piston rod 204 to the left the carrier ring 230 is spread more, and on movement to the right it is spread less. Correspondingly, the frictional resistance varies. When the groove engagement member 229 engages the groove 272, the resistance against axial movement has a peak by engagement with the flank faces 265, 266, respectively, depending on the direction of movement.

Figure 6:
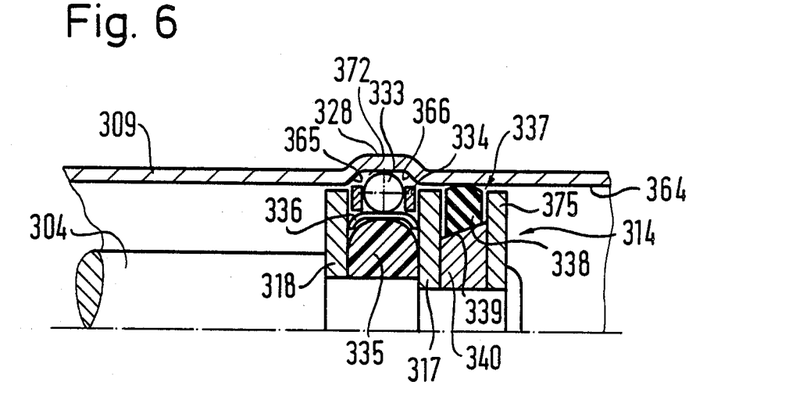
FIG. 6 shows a positioning device with an additional braking device or damping device.

In the embodiment of FIG. 6 radially movable ball members 333 are provided within a cage 334 axially located between abutment discs 317 and 318. The ball members 333 are biased in radially outward direction by an annular ball biasing member 335 of elastomeric material. The ball members 333 cooperate with flank faces 365 and 366 of a groove 372 obtained by a deformation 328. A radially expandable intermediate ring 336 separates the ball members from the biasing member 335. In this embodiment the ball members 333 have only small friction on the inner wall surface 364. Therefore, an additional brake unit 337 is provided on the piston unit 314. This brake unit comprises a support member 340 with a conical support face 339 and an annular brake member 338 between the abutment disc 317 and a further abutment disc 375. The brake member 338 has axial play between the abutment discs 317 and 375 and is spread more or less by the support face 339 in dependence of the direction of relative movement. So, the frictional resistance is increased on outward movement of the piston rod 304 and reduced on inward movement. Sudden opening of the door by wind is prevented. On the other hand, the door on closing can be accelerated and fall in the lock. In the embodiment of FIG. 5 the same occurs without additional brake.

Figure 7:
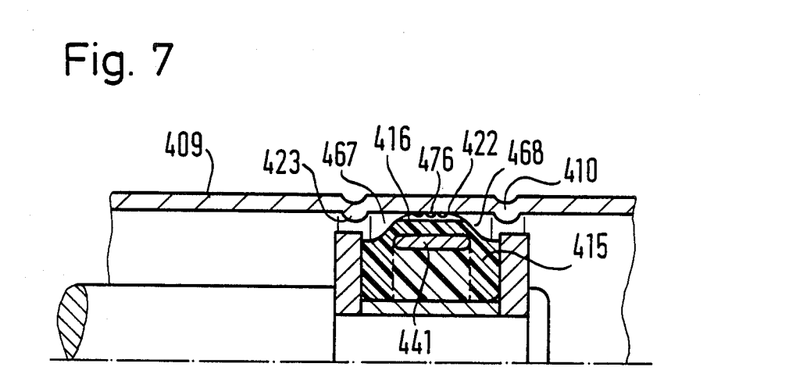
FIG. 7 shows a modification with respect to FIG. 3.

In the embodiment of FIG. 7 a spring ring 441 is vulcanized into the core of the annular body 415. Moreover, circumferential annular grooves 476 are provided in the circumferential face 422 of the annular body 415. In all other respects FIG. 7 corresponds to FIG. 3.

Figure 8:
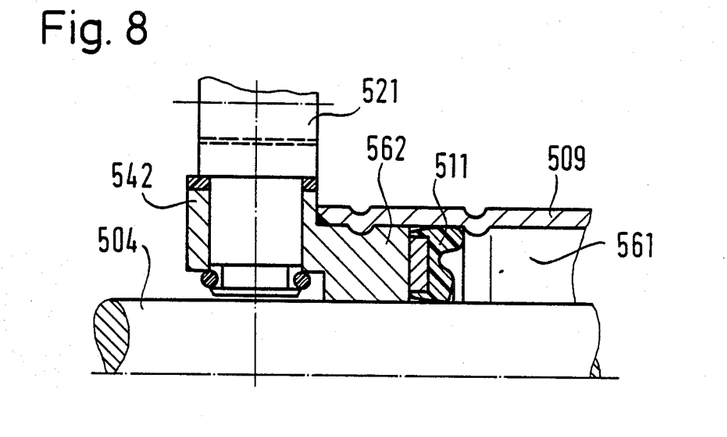
FIG. 8 shows a first fastening means of the positioning device.

Lubricant is maintained in the circumferential grooves 476. Also, in this embodiment chamfered flank engagement face 467, 468 are provided, which can override the ribs at 423 and 410. In FIG. 8 the pivotable fastening means are modified with respect to FIG. 3 in that the guiding member 512 is provided with eyelets 542 receiving pivot bolts 521.

Figure 9:
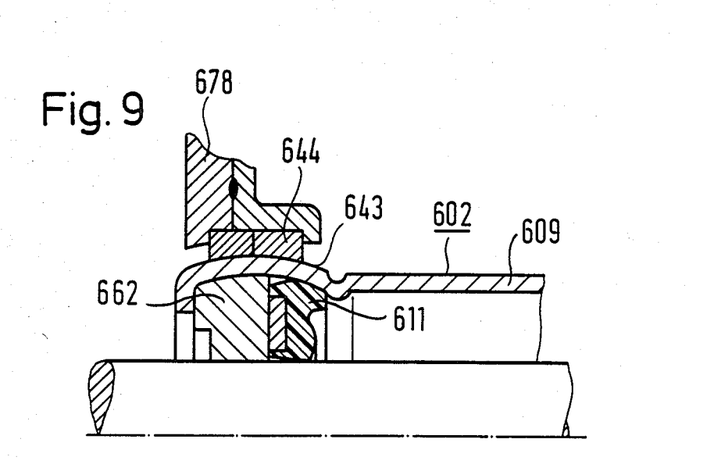
FIG. 9 shows a second embodiment of fastening means.

In FIG. 9 the cylinder 609 is provided with a ball surface 643 which is received by a ball socket 644. The socket 44 is carried by a flange 678 of the door or the body frame.

Figure 10:
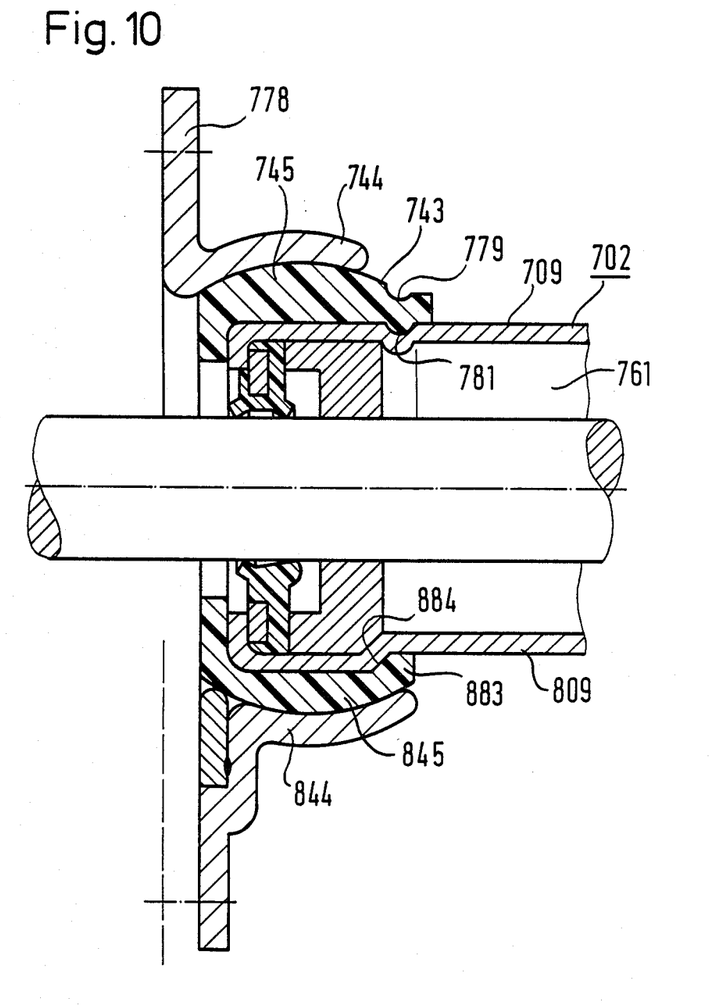
FIG. 10 shows a third embodiment of fastening means.

According to FIG. 10 (upper half) a sleeve member 745 with a partially spherical face 743 is pushed onto the wall 709 and fixed thereon by indentation 779 engaging a groove 781 of the wall 709. A socket 744 accommodates the ball-head-shaped sleeve 745 and is part of a fastening flange 778. In the lower half of FIG. 10 the ball-head-shaped sleeve 845 is pressed onto the cylinder 809 and engages by an end portion 883 a shoulder face 884 of the cylinder 809. The socket 844 substantially corresponds to the socket 744 of the upper half.

Figure 11:
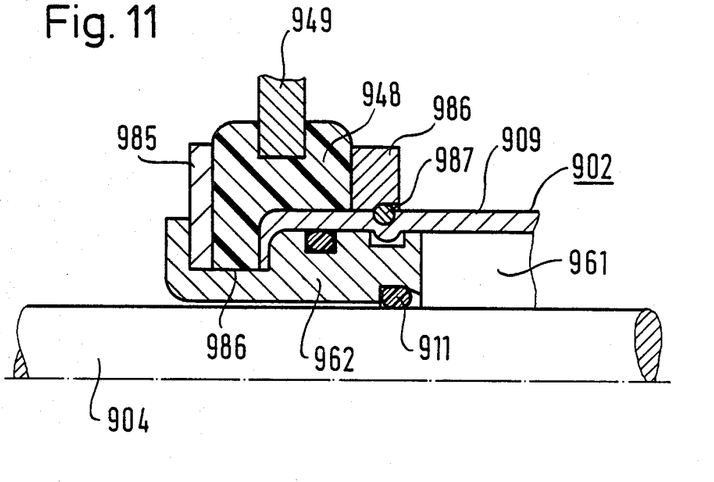
FIG. 11 shows a fourth embodiment of fastening means.

In the embodiment of FIG. 11 an elastomeric fastening member 948 is accommodated by a groove 986 within the guiding member 962 between a side disc 985 and an abutment ring 986 which is fixed on the cylinder 909 by a ring clip 987. A flange 949 engages the elastic fastening member 948. This flange is part of or fixed to the door or the body frame of a vehicle.

For fixing the pivot unit 21 of FIG. 3 and the pins 521 of FIG. 8 and the flange 678 of FIG. 9 and the flange 778 of FIG. 10 to the door or body frame of a motor vehicle it is preferred to use screws or bolts which are mounted in rubber elastic sleeves.

Specific forms of embodiment of the invention have been represented and described in order to illustrate the use of the principles of the invention. Of course the invention can also be realised in other ways without departing from these principles.

The references in the claims serve only for facilitation of understanding and are not to be understood as a limitation.

We claim:

1. A positioning device for positioning two relatively movable construction elements of a construction assembly in at least one relative position of said construction elements, said positioning device comprising:

a first positioning member having a longitudinal cavity with an axis, longitudinal wall means and two ends, said longitudinal wall means defining an inner wall surface, a second positioning member extending inwards and outwards of said cavity through at least one of said two ends and being movable with respect to said cavity along said axis, said first positioning member being provided with arresting means within said cavity and said second positioning member being provided with counter-arresting means, said arresting means comprising at least one flank face adjacent to said inner wall surface, said flank face being inclined with respect to said axis when regarded in a sectional plane containing said axis, said flank face being the result of an annular deformation of said longitudinal wall means which provides a radially inwardly projecting rib at said inner wall surface, said counter-arresting means comprising a counter-arresting member comprising an axially slit annular member with a radially inner peripheral face and a radially outer peripheral face, said axially slit annular member being biased for radial expansion, said radially outer peripheral face being provided with a radially outwardly opening peripheral groove receiving said radially inwardly projecting rib in response to axial movement of said second positioning member with respect to said first positioning member when said counter-arresting means passes said arresting means, said arresting means and said counter-arresting means being mechanically engageable with each other in at least one predetermined relative position of said first and second positioning members, respectively, engagement of said arresting means and said counter-arresting means providing increased resistance against relative movement of said first and said second positioning members in at least one direction of relative movement of said positioning members, said arresting means and said counter-arresting means being sealingly enclosed within said cavity, said first and second positioning members being provided with respective fastening means outside said cavity for fastening said positioning members to respective construction elements.

2. A positioning device for positioning two relatively movable construction elements of a construction assembly in at least one relative position of said construction elements, said positioning device comprising:
a first positioning member having a longitudinal cavity with an axis, longitudinal wall means and two ends, said longitudinal wall means defining an inner wall surface,
a second positioning member extending inwards and outwards of said cavity through at least one of said two ends and being movable with respect to said cavity along said axis,
said first positioning member being provided with arresting means within said cavity and said second positioning member being provided with counter-arresting means,
said arresting means comprising at least one flank face adjacent to said inner wall surface, said flank face being inclined with respect to said axis when regarded in a sectional plane containing said axis, said counter-arresting means at least one counter-arresting member radially inwardly displaceable with respect to said second positioning member against elastic resistance, radial inward displacement of said at least one counter-arresting member occurring in response to axial movement of said second positioning member with respect to said first positioning member when said at least one counter-arresting member passes across said flank face,
said at least one counter-arresting member comprising at least one ball member radially movable with respect to said second positioning member and biased in radially outward direction by a ball biasing member supported by said second positioning member,
said ball biasing member being annular in shape and being made of elastomeric material, a radially expandable intermediate ring being provided radially between said at least one ball member and said annular ball biasing member,
said arresting means and said counter-arresting means being mechanically engageable with each other in at least one predetermined relative position of said first and second positioning members, respectively,
engagement of said arresting means and said counter-arresting means providing increased resistance against relative movement of said first and said second positioning members in at least one direction of relative movement of said positioning members,
said arresting means and said counter-arresting means being sealingly enclosed within said cavity,
said first and second positioning members being provided with respective fastening means outside said cavity for fastening said positioning members to respective construction elements.

3. A positioning device for positioning two relatively movable construction elements of a construction assembly in at least one relative position of said construction elements, said positioning device comprising:
a first positioning member having a longitudinal cavity with an axis, longitudinal wall means and two ends, said longitudinal wall means defining an inner wall surface,
a second positioning member extending inwards and outwards of said cavity through at least one of said two ends and being movable with respect to said cavity along said axis,
said first positioning member being provided with arresting means within said cavity and said second positioning member being provided with counter-arresting means,
said arresting means and said counter-arresting means providing different resistances against relative movement in response to the direction of relative movement of said first positioning member and said second positioning member,
said arresting means and said counter-arresting means being mechanically engageable with each other in at least one predetermined relative position of said first and second positioning members, respectively,
engagement of said arresting means and said counter-arresting means providing increased resistance against relative movement of said first and said second positioning members in at least one direction of relative movement of said positioning members,
said arresting means and said counter-arresting means being sealingly enclosed within said cavity,
said first and second positioning members being provided with respective fastening means outside said cavity for fastening said positioning members to respective construction elements.

4. A positioning device for positioning two relatively movable construction elements of a construction assembly in at least one relative position of said construction elements, said positioning device comprising:
a first positioning member having a longitudinal cavity with an axis, longitudinal wall means and two ends, said longitudinal wall means defining an inner wall surface,
a second positioning member extending inwards and outwards of said cavity through at least one of said two ends and being movable with respect to said cavity along said axis,
said first positioning member being provided with arresting means within said cavity and said second positioning member being provided with counter-arresting means, said arresting means and said counter-arresting means being mechanically engageable with each other in at least one predetermined relative position of said first and second positioning members, respectively, engagement of said arresting means and said counter-arresting means providing increased resistance against relative movement of said first and said second positioning members in at least one direction of relative movement of said positioning members, said arresting means and said counter-arresting means being sealingly enclosed within said cavity, said first and second positioning members being provided with respective fastening means outside said cavity for fastening said positioning members to respective construction elements, said respective fastening means being suited for pivotally fastening said first and said second positioning members to respective construction elements, said fastening means of said first positioning member being provided adjacent to said at least one end of said first positioning member through which said second positioning member extends, said fastening means of said first positioning member comprising adjacent to said one end of said cavity at least one of a pivot bore and a pivot pin substantially radial with respect to said axis.

5. A positioning device for positioning two relatively movable construction elements of a construction assembly in at least one relative position of said construction elements, said positioning device comprising a first positioning member having a longitudinal cavity with an axis, longitudinal wall means and two ends, said longitudinal wall means defining an inner wall surface, a second positioning member extending inwards and outwards of said cavity through at least one of said two ends and being movable with respect to said cavity along said axis, said first positioning member being provided with arresting means within said cavity and said second positioning member being provided with counter-arresting means, said arresting means and said counter-arresting means being mechanically engageable with each other in at least one predetermined relative position of said first and second positioning members, respectively, engagement of said arresting means and said counter-arresting means providing increased resistance against relative movement of said first and said second positioning members in at least one direction of relative movement of said positioning members, said arresting means and said counter-arresting means being sealingly enclosed within said cavity, said first and second positioning members being provided with respective fastening means outside said cavity for fastening said positioning members to respective construction elements, said respective fastening means being suited for pivotally fastening said first said second positioning members to respective construction elements, said fastening means of said first positioning member being provided adjacent to said at least one end of said first positioning member through which said second positioning member extends, said first positioning member being provided adjacent to said at least one end with a partially spherical ball head received by a ball socket of the respective fastening means.

6. A positioning device for positioning two relatively movable construction elements of a construction assembly in at least one relative position of said construction elements, said positioning device comprising:

a first positioning member, namely a casing having a longitudinal cavity with an axis, longitudinal wall means and two ends, said longitudinal wall means defining an inner wall surface, a second positioning member extending inwards and outwards of said cavity through at least one of said two ends and being movable with respect to said cavity along said axis, said first positioning member being provided with arresting means within said cavity and said second positioning member being provided with counter-arresting means, said arresting means and said counter-arresting means being mechanically engageable with each other in at least one predetermined relative position of said first and second positioning members, respectively, engagement of said arresting means and said counter-arresting means providing increased resistance against relative movement of said first and said second positioning members in at least one direction of relative movement of said positioning members, said arresting means and said counter-arresting means being sealingly enclosed within said cavity, said first and second positioning members being provided with respective fastening means outside said cavity for fastening said positioning members to respective construction elements, said respective fastening means being suited for pivotally fastening said first and said second positioning members to respective construction elements, said fastening means of said first positioning member comprising an annular elastic fastening member engaging at least one of said first positioning member and a guiding member guiding said second positioning member adjacent to said one end of said cavity.

7. A positioning device as claimed in claim 3, said first positioning member (2) being a cylindrical casing (2), said arresting means (10) being provided on said cylindrical casing (2).

8. A positioning device as claimed in claim 3, said second positioning member (4) being a piston rod member (4), said piston rod member (4) being provided with a piston unit (14) within said cavity (61), said counter-arresting means (15) being part of said piston unit (14).

9. A positioning device as claimed in claim 3, said piston rod member (4) extending through only one end of said cavity (61), the other end of said cavity (61) being closed by an end wall (60).

10. A positioning device as claimed in claim 3, said arresting means (10) comprising at least one flank face (65, 66) adjacent to said inner wall surface (64), said flank face (65, 66) being inclined with respect to said axis when regarded in a sectional plane containing said axis, said counter-arresting means (15) comprising a counter-arresting member (15) radially inwardly displaceable with respect to said second positioning member (4) against elastic resistance, radial inward displacement of said counter-arresting member (15) occurring in response to axial movement of said second positioning member (4) with respect to said first positioning member (2) when said counter-arresting member (15) passes across said flank face (65, 66).

11. A positioning device as claimed in claim 3, said flank face (65, 66) being the result of an annular deformation (10) of said longitudinal wall means (9).

12. A positioning device as claimed in claim 3, said annular deformation (10) of said longitudinal wall means (9) providing a radially inwardly projecting rib (10) at said inner wall surface (64).

13. A positioning device as claimed in claim 3, said annular deformation (328) providing a radially outwardly extending, groove (372) in said inner wall surface (364).

14. A positioning device as claimed in claim 3, said counter-arresting member (15) being an annular body (15) of elastic material, said annular body (15) of elastic material having at least one flank engagement face (67, 68).

15. A positioning device as claimed in claim 3, said (15) of elastic material having an external circumferential face (22) engaging said inner wall surface (64).

16. A positioning device as claimed in claim 3, said external circumferential face (22) being provided with recesses (16).

17. A positioning device as claimed in claim 3, said recesses (16) being axially extending grooves (16) and/or circumferentially extending grooves (476).

18. A positioning device as claimed in claim 3, said annular body (415) of elastic material including a radially elastic reinforcement ring member (441).

19. A positioning device as claimed in claim 3, said flank engagement face (67, 68) being inclined with respect to said axis by an acute angle when regarded in a plane containing said axis.

20. A positioning device as claimed in claim 3, said external circumferential face (22) having an axial length substantially smaller than the axial length of said annular body (15) of elastic material.

21. A positioning device as claimed in claim 3, said counter-arresting member (124) comprising an axially slit annular member (124) with a radially inner peripheral face and a radially outer peripheral face (125), said axially slit annular member (124) being biased for radial expansion, said radially outer peripheral face (125) being provided with a radially outwardly opening peripheral groove (126), said radially outwardly opening peripheral groove (126) receiving said radially inwardly projecting rib (110) in response to axial movement of said second positioning member (104) with respect to said first positioning member (102) when said counter-arresting means (124) pass said arresting means (110).

22. A positioning device as claimed in claims 1 or 3 said axially slit annular member (124) being located axially between two abutment discs (117, 118) mounted on said second positioning member (104).

23. A positioning device as claimed in claims 1 or 3, said axially slit annular member (124) comprising a plurality of segments.

24. A positioning device as claimed in claim 1 or 3, said axially slit annular member (124) being biased for radial expansion by at least one elastic biasing member (127) engaging the radially inner peripheral face of said axially slit annular member (124), said elastic biasing member (127) being an annular biasing member (127) of rubber elastic material, said annular biasing member (127) being supported by a radially outer supporting face of said second positioning member (104).

25. A positioning device as claimed in claim 3, said counter-arresting member (229) being an annular groove engagement member (229) biased for radial expansion, said annular groove engagement member (229) being engageable with said radially outwardly extending groove (272) in said inner wall surface (264).

26. A positioning device as claimed in claim 3, said counter-arresting member (333) comprising at least one ball member (333) radially movable with respect to said second positioning member (304) and biased in radially outward direction by a ball biasing member (335) supported by said second positioning member (304).

27. A positioning device as claimed in claim 3, said ball biasing member (335) being annular in shape and being made of elastomeric material, a radially expandable intermediate ring (336) being provided radially between said at least one ball member (333) and said annular ball biasing member (335).

28. A positioning device as claimed in claim 2 or 3, a plurality of ball members (333) being provided, said plurality of ball members (333) being received by an annular cage member (334).

29. A positioning device as claimed in claim 3, said arresting means (10) comprising a plurality of flank faces (65, 66) of different inclinations with respect to said axis.

30. A positioning device as claimed in claim 3, said counter-arresting member (15) comprising a plurality of flank engagement faces (67, 68) of different inclinations with respect to said axis.

31. A positioning device as claimed in claim 3, said elastic resistance resisting radial inward displacement of said counter-arresting member (229) being variable in response to the direction of axial relative movement of said first positioning member (202) and said second positioning member (204).

32. A positioning device as claimed in claim 3, said counter-arresting member (229) frictionally engaging said inner wall surface (264) and being radially supported with axial play on a conical support face (231) of said second positioning member (204).

33. A positioning device as claimed in claim 3, brake means (337) being provided between said first and said second positioning members (309, 304) braking axially relative movement thereof in at least one range of movement outside said at least one predetermined relative position.

34. A positioning device as claimed in claim 3, said brake means (337) comprising an annular frictional member (338) of elastic material radially supported by said second positioning member (304) and frictionally engaging said inner wall surface (364).

35. A positioning device as claimed in claim 3, said brake means (337) having different braking effects in response to the direction of relative axial movement of said first and said second positioning members (302, 304).

36. A positioning device as claimed in claim 3, said annular frictional member (338) being radially supported with axial play by a conical support face (339) of said second positioning member (304).

37. A positioning device as claimed in claim 3, said fastening means being suited for pivotally fastening said first and said second positioning members (2, 4) to respective construction elements (5, 7).

38. A positioning device as claimed in claim 3, said fastening means of said first positioning member (2) being provided adjacent to said at least one end of said first positioning member (2) through which said second positioning member (4), extends.

39. A positioning device as claimed in claim 3, said fastening means comprising adjacent to said one end of said cavity (61) at least one of a pivot bore (69) and a pivot pin (70) substantially radial with respect to said axis.

40. A positioning device as claimed in claim 3, said at least one of a pivot bore (69) and a pivot pin (70) being provided in a guiding member (562) guiding said second positioning member (504) through said one end of said cavity (561).

41. A positioning device as claimed in claim 3, said casing (602) being provided adjacent to said at least one end with a partially spherical ball head (643) received by a ball socket (644) of the respective fastening means.

42. A positioning device as claimed in claim 3, said partially spherical ball head (643) being shaped from the material (609) of said casing (602).

43. A positioning device as claimed in claim 3, said partially spherical ball head (745) being provided on a ball head carrier member (745) fastened to said casing (702) adjacent to said at least one end of said cavity (761).

44. A positioning device as claimed in claim 3, said fastening means of said first positioning member (902) comprising an annular elastic fastening member (948) engaging at least one of said casing (902) and a guiding member (962) guiding said second positioning member (904) adjacent to said one end of said cavity (961).

45. A positioning device as claimed in claim 3, said annular elastic fastening member (948) being engaged in groove means (986) adjacent to said one end of said cavity (961) through which said second positioning member (904) extends, said annular elastic fastening member (948) being engageable with a rigid fastening member (949) fixed with respect to the respective construction part.

46. A positioning device as claimed in claims 3, 4, 5 or 6 one of said construction elements (5, 7) being a body frame (5) of a motor vehicle and the other one (7) of said construction elements being a door (7) of said motor vehicle, one (2) of said positioning members (2, 4) being fastened to said body frame (5) of said motor vehicle and the other one (4) of said positioning members (2, 4) being fastened to said door (7).

47. A positioning device as claimed in claims 3, 4, 5 or 6 door (7) being pivotally mounted on said body frame (5) about a door pivot axis (D), said first and second positioning members (2, 4) being pivotally fastened to respective ones of said body frame (5) and said door (7) about fastening pivot axes (6, 8) substantially parallel to said door pivot axis (D).

48. A positioning device as claimed in claim 3, 4, 5 or 6, said first positioning member being accommodated within a hollow space of said door and being pivotally connected with said door at a location of said first positioning member adjacent to said at least one end thereof through which said second positioning member extends, said second positioning member having an end portion outside said cavity, said end portion being pivotally connected to said body frame of said motor vehicle.

49. A positioning device for positioning two relatively movable construction elements of a construction assembly in at least one relative position of said construction elements, said position device comprising:

a first positioning member having a longitudinal cavity with an axis, longitudinal wall means and tow ends, said longitudinal wall means defining an inner wall surface, a second positioning member extending inwards and outwards of said cavity through at least one of said two ends and being movable with respect to said cavity along said axis, said first positioning member being provided with arresting means within said cavity and said second positioning member being provided with counter-arresting means, said arresting means comprising a plurality of flank faces adjacent to said inner wall surface, said flank faces being inclined at different inclinations with respect to said axis when regarded in a sectional plane containing said axis, said counter-arresting means comprising a counter-arresting member radially inwardly displaceable with respect to said second positioning member against elastic resistance, radial inward displacement of said counter-arresting member occurring in response to axial movement of said second positioning member with respect to said first positioning member when said counter-arresting member passes across said flank face, said arresting means and said counter-arresting means being mechanically engageable with each other in at least one predetermined relative position of said first and second positioning members, respectively, engagement of said arresting means and said counter-arresting means providing increased resistance against relative movement of said first and said second positioning members in at least one direction of relative movement of said positioning members, said arresting means and said counter-arresting means being sealingly enclosed within said cavity, said first and second positioning members being provided with respective fastening means outside said cavity for fastening said positioning members to respective construction elements.

50. A positioning device for positioning two relatively movable construction elements of a construction assembly in at least one relative position of said construction elements, said positioning device comprising:

a first positioning member having a longitudinal cavity with an axis, longitudinal wall means and two ends, said longitudinal wall means defining an inner wall surface, a second positioning member extending inwards and outwards of said cavity through at least one of said two ends and being movable with respect to said cavity along said axis, said first positioning member being provided with arresting means within said cavity and said second positioning member being provided with counter-arresting means, said arresting means comprising at least one flank face adjacent to said inner wall surface, said flank face being inclined with respect to said axis when regarded in a sectional plane containing said axis, said counter-arresting means comprising a counter-arresting member radially inwardly displaceable with respect to said second positioning member against elastic resistance, radial inward displacement of said counter-arresting member occurring in response to axial movement of said second positioning member with respect to said first positioning member when said counter-arresting member passes across said flank face
said counter-arresting member comprising a plurality of flank engagement faces of different inclinations with respect to said axis,
said arresting means and said counter-arresting means being mechanically engageable with each other in at least one predetermined relative position of said first and second positioning members, respectively,
engagement of said arresting means and said counter-arresting means providing increased resistance against relative movement of said first and said second positioning members in at least one direction of relative movement of said positioning members,
said arresting means and said counter-arresting means being sealingly enclosed within said cavity,
said first and second positioning members being provided with respective fastening means outside said cavity for fastening said positioning members to respective construction elements.

51. A positioning device for positioning two relatively movable construction elements of a construction assembly in at least one relative position of said construction elements, said positioning device comprising:
a first positioning member having a longitudinal cavity with an axis, longitudinal wall means and two ends, said longitudinal wall means defining an inner wall surface,
a second positioning member extending inwards and outwards of said cavity through at least one of said two ends and being movable with respect to said cavity along said axis,
said first positioning member being provided with arresting means within said cavity and said second positioning member being provided with counter-arresting means,
said arresting means comprising at least one flank face adjacent to said inner wall surface, said flank face being inclined with respect to said axis when regarded in a sectional plane containing said axis, said counter-arresting means comprising a counter-arresting member radially inwardly displaceable with respect to said second positioning member against elastic resistance, radial inward displacement of said counter-arresting member occurring in response to axial movement of said second positioning member with respect to said first positioning member when said counter-arresting member passes across said flank face,
said elastic resistance resisting radial inward displacement of said counter-arresting member being variable in response to the direction of axial relative movement of said first positioning member and said second positioning member,
said counter-arresting member frictionally engaging said inner wall surface and being radially supported with axial play on a conical support face of said second positioning member,
said arresting means and said counter-arresting means being mechanically engageable with each other in at least one predetermined relative position of said first and second positioning members, respectively,
engagement of said arresting means and said counter-arresting means providing increased resistance against relative movement of said first and said second positioning members in at least one direction of relative movement of said positioning members,
said arresting means and said counter-arresting means being sealingly enclosed within said cavity,
said first and second positioning members being provided with respective fastening means outside said cavity for fastening said positioning members to respective construction elements.

52. A positioning device for positioning two relatively movable construction elements of a construction assembly in at least one relative position of said construction elements, said positioning device comprising:
a first positioning member having a longitudinal cavity with an axis, longitudinal wall means and two ends, said longitudinal wall means defining an inner wall surface,
a second positioning member extending inwards and outwards of said cavity through at least one of said two ends and being movable with respect to said cavity along said axis,
a brake means being provided between said first and said second positioning members braking axially relative movement thereof in at least one range of movement outside said at least one predetermined relative position,
said brake means comprising an annular frictional member of elastic material radially supported with axial play by a conical support face of said second positioning member and frictionally engaging said inner wall surface,
said first positioning member being provided with arresting means within said cavity and said second positioning member being provided with counter-arresting means,
said arresting means and said counter-arresting means being mechanically engageable with each other in at least one predetermined relative position of said first and second positioning members, respectively,
engagement of said arresting means and said counter-arresting means providing increased resistance against relative movement of said first and said second positioning members in at least one direction of relative movement of said positioning members,
said arresting means and said counter-arresting means being sealingly enclosed within said cavity,
said first and second positioning members being provided with respective fastening means outside said cavity for fastening said positioning members to respective construction elements.

* * * * *

UNITED STATES PATENT AND TRADEMARK OFFICE
CERTIFICATE OF CORRECTION

PATENT NO. : 4,867,317
DATED : September 19, 1989
INVENTOR(S) : Willi Wildemann et al.

It is certified that error appears in the above-identified patent and that said Letters Patent is hereby corrected as shown below:

First page, Abstract, line 18, "AS" should read --as--;
Col. 8, line 3, "face" should read --faces--;
Col. 8, line 10, "44" should read --644--;
Col. 9, line 47, after "means" insert --including--;
Col. 10, line 21, "end" should read --ends--;
Col. 11, line 61, after "first" insert --and--;
Col. 13, line 26, after "being" insert --at least one of--;
Col. 13, lines 26-27, "and/or" should read --and--;
Col. 13, line 60, "claim" should read --claims--;
Col. 14, line 19, "claim" should read --claims--;
Col. 15, line 40, after "6" insert a comma;
Col. 15, line 49, after "6" insert --, said--;
Col. 15, line 68, "position" should read --positioning--;
Col. 16, line 2, "tow" should read --two--.

Signed and Sealed this

Twenty-third Day of October, 1990

*Attest:*

HARRY F. MANBECK, JR.

*Attesting Officer*     *Commissioner of Patents and Trademarks*